Oct. 16, 1934.  D. C. KLAUSMEYER  1,976,943
TORQUE DISCRIMINATOR
Filed Nov. 22, 1930  3 Sheets-Sheet 1
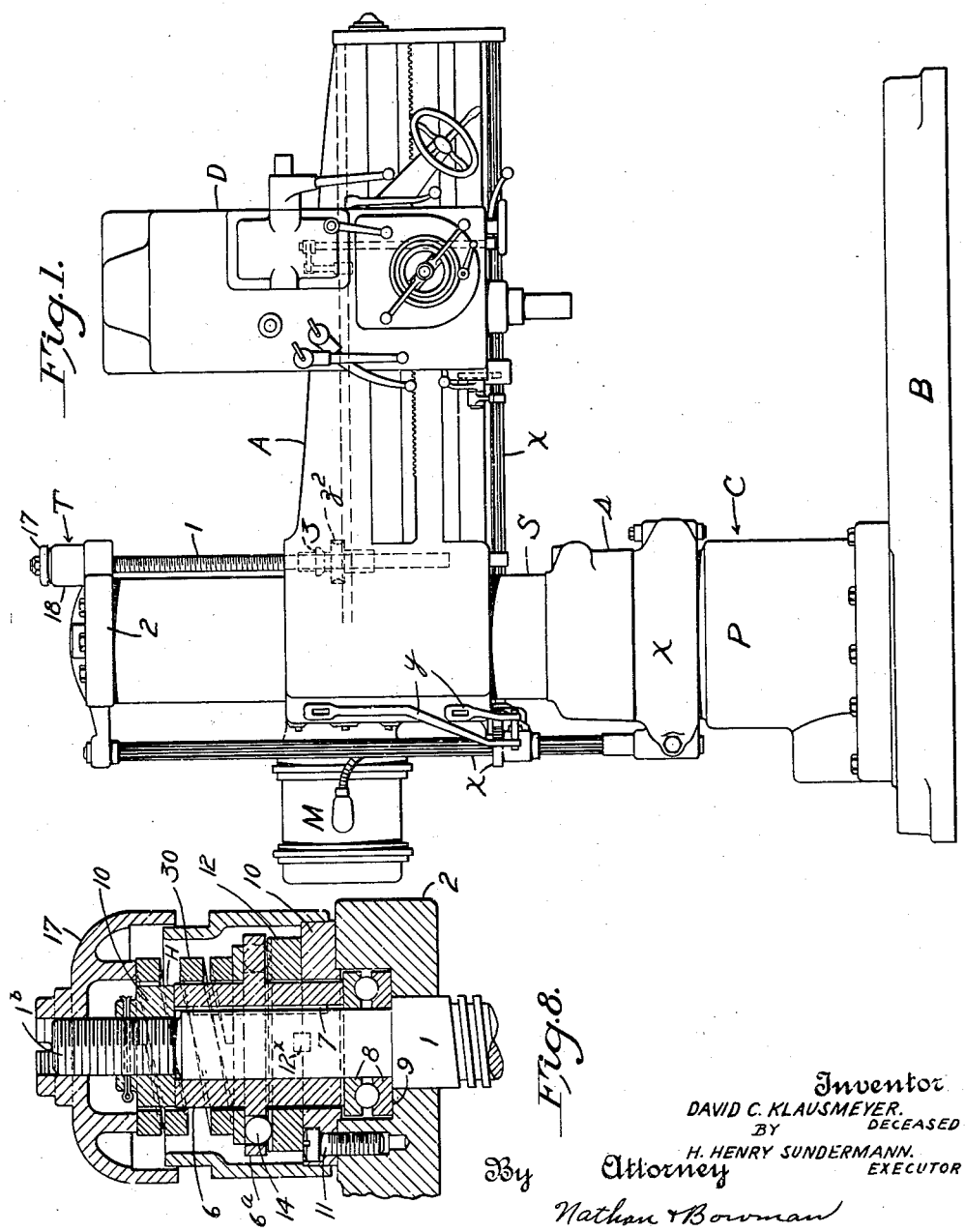
Inventor
DAVID C. KLAUSMEYER.
BY  DECEASED
H. HENRY SUNDERMANN.
EXECUTOR
By Attorney
Nathan & Bowman

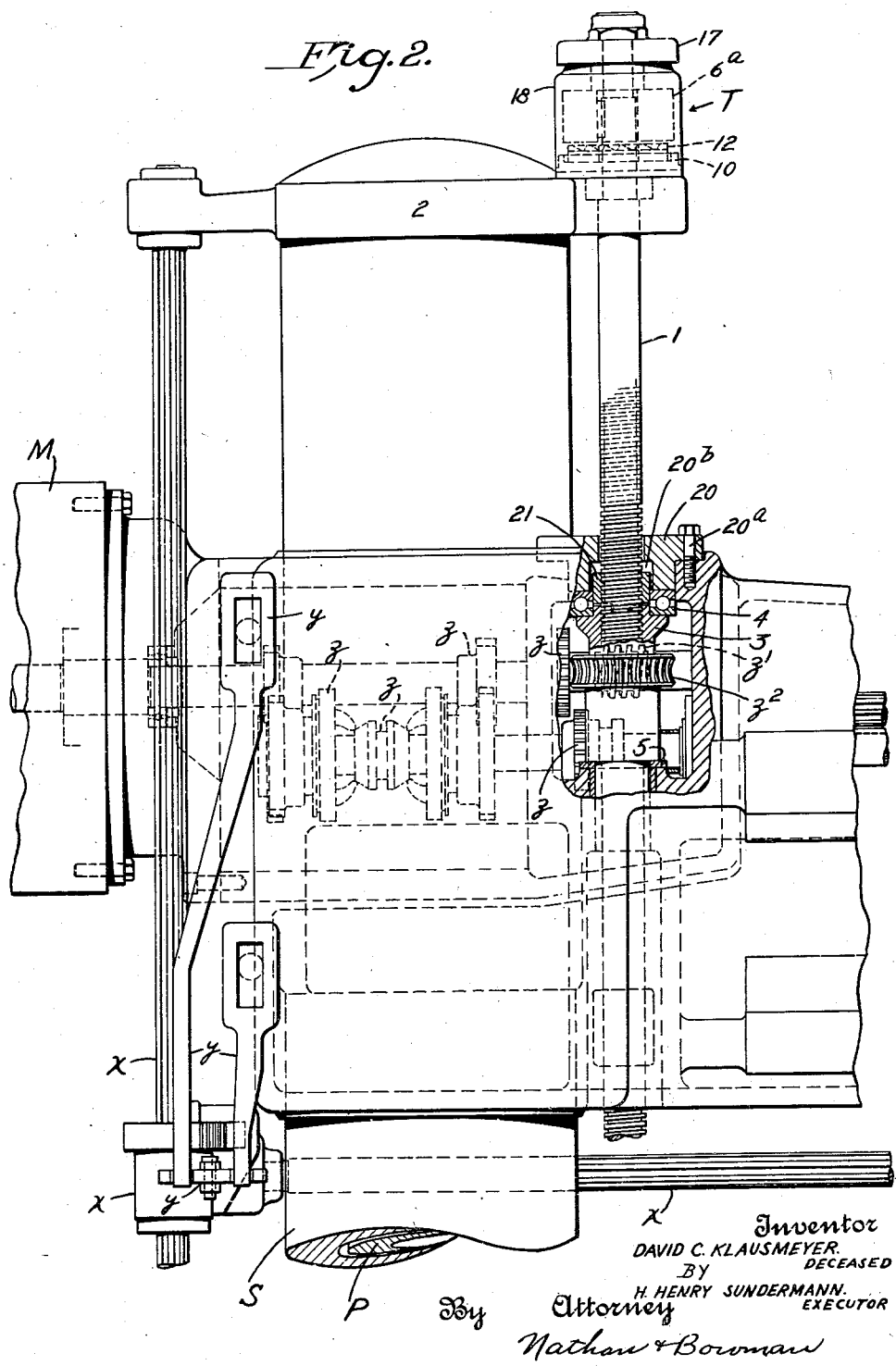

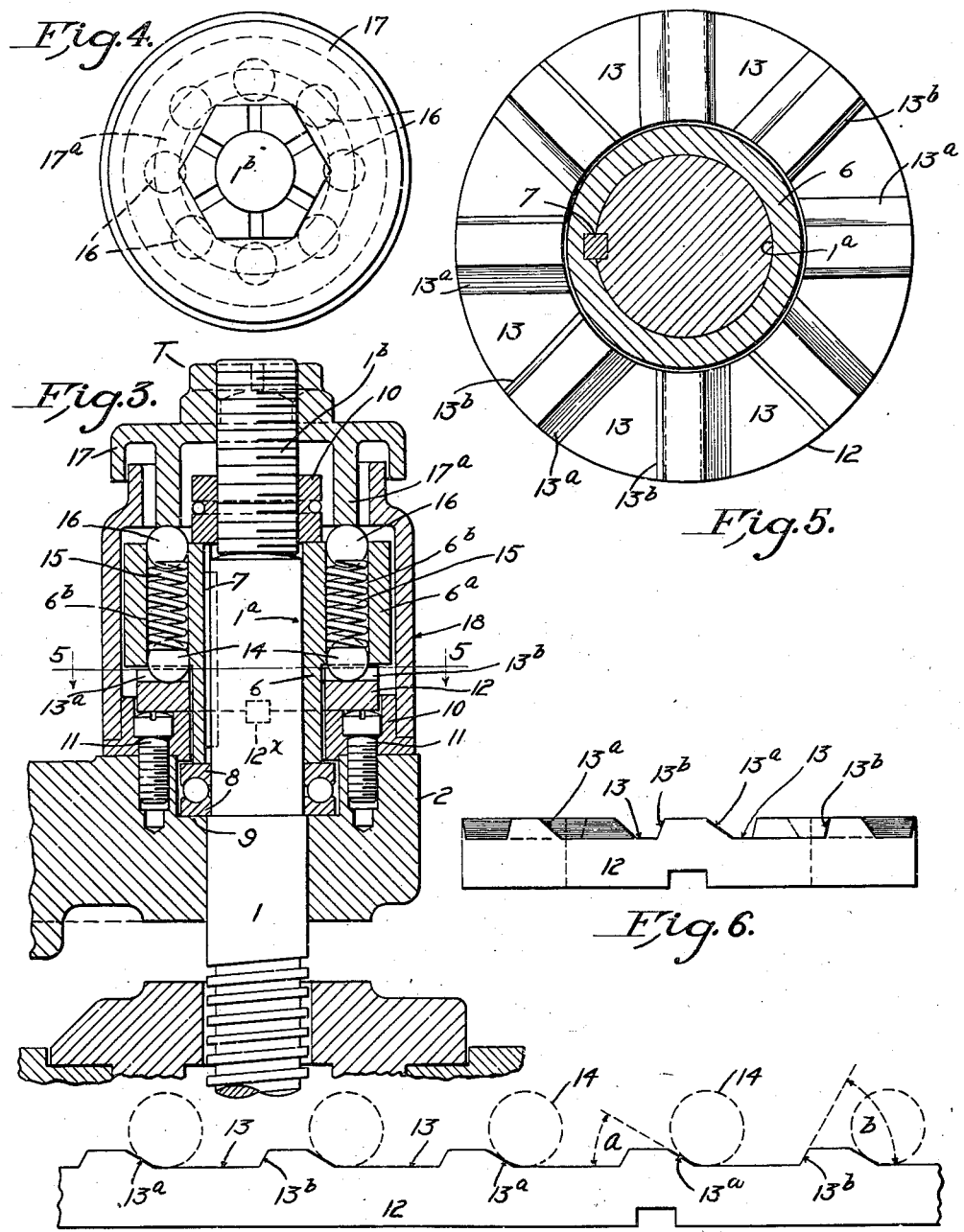

Patented Oct. 16, 1934

UNITED STATES PATENT OFFICE 1,976,943

TORQUE DISCRIMINATOR

David C. Klausmeyer, deceased, late of Cincinnati, Ohio, by H. Henry Sundermann, executor, Cincinnati, Ohio, assignor to The Cincinnati Bickford Tool Company, Cincinnati, Ohio, a corporation of Ohio Application November 22, 1930, Serial No. 497,586

4 Claims. (Cl. 77—28)

This invention deals with machine tools and it has for an object to provide improved means for limiting, to predetermined unequal magnitudes, the torque adapted to be transmitted through a mechanism operating, in opposite directions, under substantially different loads.

A radial drill is a good example of a machine tool in which this condition obtains, the arm translating mechanism being that which is operated in opposite directions against substantially different resistances due to the fact that in upward movement of the arm the weight of the arm is an additional factor in the load imposed upon the translating means, whereas in downward movement thereof the weight of the arm tends to assist the translating mechanism. Thus it will be perceived that a substantially greater force is required to be transmitted during elevation of the arm than during depression thereof. This invention will, therefore, be described as embodied in the arm translating mechanism of a radial drill but it is to be understood that it is in nowise limited to that adaptation. The present invention is an improvement over that forming the subject matter of United States Patent No. 1,496,577.

An object of this invention is to provide an improved mechanism capable of resisting, in opposite directions, torque of predetermined magnitude sufficient to effect elevation and depression of a radial drill arm and which will become ineffective when the load imposed upon said mechanism exceeds a predetermined maximum, such for example as might be caused by the arm contacting with some stationary obstruction. In other words the invention has for one of its objects to provide a torque discriminator effective, in opposite directions, proportionately to the stresses normally applied thereto.

Another object of this invention is to provide a device of this nature which is particularly adapted to that type of arm translating mechanism embodying a rotatable nut and a normally stationary screw cooperating therewith.

Still another object is to provide a torque discriminator which is more compact and therefore less unsightly, than prior devices, which is readily adjustable to different loads and which may be manufactured and assembled with great facility and at a minimum of expense.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of a radial drill embodying this invention. Fig. 2 is an enlarged view of a portion of Fig. 1 showing, in section, the rotary arm-translating nut and parts associated therewith. Fig. 3 is an enlarged sectional view of the improved torque discriminator applied to the arm translating screw. Fig. 4 is a plan view of Fig. 3. Fig. 5 is an enlarged section on the line 5—5 of Fig. 3. Fig. 6 is a side elevation of the serrated torque discriminator ring shown in Fig. 5. Fig. 7 is a diagrammatic view illustrating more clearly the unequal angles of the opposite facets of the torque discriminator ring, whereby the device is adapted to resist substantially greater torque in one direction than in the other, and Fig. 8 is a view similar to Fig. 3 but showing a modified construction.

Referring more specifically to the drawings the invention is disclosed as embodied in a radial drill comprising a base B, a column C, a radial arm A, supported by the column, and a drill head D carried by the radial arm. The column preferably consists of a post P and a sleeve S rotatably journaled thereon and adapted to be clamped thereto by mechanism designated generally as $x$. The arm A is translatably mounted on the sleeve S and may be clamped thereto in any position of vertical adjustment by mechanism designated generally as $y$. A motor M, mounted on a rearward extension of the arm provides power to actuate the usual tool spindle, journaled in the drill head, and to effect translation of the arm on the sleeve.

The arm translating mechanism comprises a normally stationary screw 1, supported in a cap 2, seated upon the upper end of the sleeve. A nut 3, rotatably journaled in the arm A, and held against axial movement therein by thrust bearings 4 and 5, engages the threads of the screw 1 and acts, when rotated in one direction, to climb the screw and thereby to elevate the arm. When rotated in the opposite direction, the nut travels downward on the screw and lowers the arm. The bearing 4 is of the anti-friction type and is held against upward movement by a thrust ring 20 fitted within an aperture in the arm and held therein by screws as 20$^a$. The thrust ring is formed with a counterbore 20$^b$ adapted to receive an auxiliary or safety nut 21 threaded upon the screw 1 and clutched to turn with the nut 3. This safety nut is normally maintained strain-free and therefore the threads thereof do not wear. Should the threads in the main nut 3 strip and thereby fail to support the arm, the thrust ring 20 will, after a slight downward movement of the arm, engage the upper end of the safety nut which will support the arm against further downward movement. This initial drop of the arm is sufficient to declutch the nuts 3 and 20 and further rotation of the nut 3 will not effect translation of the arm. This serves to notify the operator that the main nut has failed.

Any suitable means may be provided for rotating the nut 3, such, for example, as that shown partly in full lines and partly in dotted lines in Fig. 2 designated generally as $z$ and including a worm $z'$ which drives a worm wheel $z^2$ fixed to said nut.

Under normal conditions the screw 1 is maintained nonrotatable in the cap 2 and the nut 3 is rotated selectively either clockwise or counter-clockwise thereon (as viewed from above) to effect depression or elevation of the arm. To limit the torque to which the arm translating mechanism may be subjected when the arm meets with any obstruction such, for example, as by engaging the cap 2 or the cuff $s$ of the sleeve S, a torque discriminator T in the form of an impositive clutch is supported by the cap 2 and engages the upper end of the screw 1. This torque discriminator comprises a sleeve 6 keyed, as at 7, to an upper unthreaded portion $1^a$ of the arm-translating screw 1. The lower end of the sleeve 6 rests upon an anti-friction thrust bearing 8, supported upon a seat 9, provided by the cap 2. The upper end of the sleeve 6 is engaged by a nut 10 threaded upon a reduced threaded portion $1^b$ of the screw 1. Thus the weight of the screw, and the arm A supported thereby, is transmitted to the cap 2 and consequently to the sleeve S.

The sleeve 6 and screw 1 are normally held against rotation as will now be explained. The sleeve is formed with an enlarged flange portion $6^a$ provided with a plurality of equally spaced bores $6^b$ preferably eight in number, extending parallel to the axis of the sleeve. Beneath the flange portion $6^a$ and above a supporting collar 10, fixed to the cap 2 by screws 11, there is arranged a torque discriminator ring 12 formed with a plurality of radially disposed segmental depressions 13 providing two series of oppositely inclined facets $13^a$ and $13^b$. The collar 10 and the ring 12 are dogged together against relative rotation by a key $12^x$ as shown in dotted lines in Fig. 3. In the construction shown in Fig. 3 detent elements 14, preferably in the form of balls, one of which is fitted into each of the bores $6^b$, are adapted to be seated in the depression 13 and, upon rotation of the screw 1 and sleeve 6 in opposite directions, as later will be explained, engage the facets $13^a$ and $13^b$. Coil springs 15 fitted within the bores $6^b$ serve to depress the balls 14 into the depressions 13 and to resist upward movement of the balls under the influence of the facets $13^a$ and $13^b$. The tension of the springs 15 is determined by the position of similar balls 16 engaging the upper ends of the springs. To vary the tension of the springs 15 so that the device may be adjusted to various loads, the balls 16 are engaged by the depending annular flange $17^a$ of a cap 17 threaded upon the upper threaded portion $1^b$ of the arm translating screw. A sleeve 18, fitted to the collar 10, surrounds the ring 12 and portion $6^b$ of the sleeve 6 and, together with the cap 17, form a closed housing for the mechanism.

It is to be observed that the angle of the facets $13^b$ to the horizontal, is substantially greater than the angle of the facets $13^a$. This is clearly illustrated in Fig. 7 in which $a$ represents the angle of the facets $13^a$ and $b$ represents the angle of the facets $13^b$. It will readily be perceived that due to the angles of the facets a substantially greater force will be required to cause the facet $13^b$ to elevate the balls than will be required to cause the facet $13^a$ to elevate them. Thus it will be understood that a materially greater torque may be transmitted in a counter-clockwise direction, as viewed in Fig. 5, which corresponds to the direction of rotation of the nut 3 when elevating the arm, than may be transmitted in the opposite direction as when the arm is lowered.

Fig. 8 shows a modified form to torque discriminator which differs somewhat from that shown in Fig. 3. This modified construction is generally similar to that previously described in that it includes the elements 7, 8, 9, 10, 11, 12, 14, 16 and 17 which differ in form only slightly, if at all, from those of Fig. 3. The principal difference resides in the provision of a single heavy coil spring 30 for yieldingly depressing all of the detent balls 14 into the depressions 13 in the ring 12 instead of employing the individual lighter coil springs 15 as in the construction previously described.

In this modified construction the head portion $6^a$ of the sleeve 6 is made relatively thin as compared with the construction shown in Fig. 3, and a washer 31 is interposed between the balls 14 and the spring 30. The tension of the spring 30 may be varied by adjusting the cap 17 on the threaded end $1^b$ of the arm translating screw 1.

The operation of the device when embodied in a drill arm translating mechanism is as follows:—

Presupposing that the cap 17 has been adjusted to give the springs 15 the proper tension for the weight of the arm A and parts carried thereby and that the nut-rotating mechanism $z$ has been set in motion to rotate the nut 3 counter-clockwise as viewed in plan. The nut, and the arm in which it is journaled, will climb the screw 1 which is then held against rotation due to the fact that the balls 14 are engaging the facets $13^b$ of the torque-discriminator ring 12. Inasmuch as the arm A and drill head carried thereby are ponderous elements a relatively great force is required to rotate the nut which in turn transmits a heavy torque to the screw 1 tending to turn it and the sleeve 6 and balls 14 clockwise, as viewed in plan. This torque, however, will be resisted by the facets $13^b$. Now, suppose, the arm meets an obstruction such, for example, as engaging the cap 2, and its upward movement is arrested. The nut rotating mechanism continues to function and the nut tries further to climb the screw. This, however, is now precluded with the result that the screw 1 first tends to move axially downward. This movement, however, is effectively resisted by the nut 10, sleeve 6, thrust bearing 8 and the cap 2. Continued rotation of the nut 3 therefore places an additional torque on the screw 1 which causes the balls 14 to ride up the facets $13^b$ of the stationary ring 12 and down the facets $13^a$ thereby permitting the screw 1 to rotate with the nut 3. The successive contact of the balls 14 with the facets $13^b$ and $13^a$ and the face of the ring 12 produces a noise which serves as a warning to the operator.

When the nut 3 is rotated in the opposite direction to lower the arm the screw tends to turn clockwise thereby placing the balls 14 in contact with the facets 13ª. As hereinbefore explained a substantially less force is required to be transmitted when lowering the arm and therefore the less inclined facets offer sufficient resistance normally to prevent rotation of the screw. Should downward movement of the arm be arrested such, for example, as by the tool contacting with a work-piece or by the girdle of the arm engaging the cuff s of the sleeve the reaction on the nut 3 screw 1 and the torque discriminator will be similar to that previously described but in the opposite direction, thereby causing the balls 14 to ride up the facets 13ª and down the facets 13ᵇ thus permitting the screw 1 to rotate with the nut 3.

From the foregoing it will readily be perceived that this invention provides improved means for resisting predetermined torques of unequal magnitudes in opposite directions and affords means whereby the mechanism may be rendered ineffective, without damage, when said predetermined magnitudes have been exceeded.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, it is claimed as new and desired to secure the following combinations and elements, or equivalents thereof, by Letters Patent of United States:—

1. In a radial drill having a column, an arm translatable thereon, and a power driven transmission including a normally stationary screw supported from said column and a rotatable nut carried by said arm and threaded on said screw for translating said arm on said column; an impositive clutch supported by said column and acting upon said screw normally to hold it against rotation, said clutch comprising a ring non-rotatably secured to said column and provided with a plurality of sets of oppositely inclined facets; a thrust bearing surrounding said screw and supported by said column; a column surrounding said screw and held against rotation relative thereto, said sleeve engaging said thrust bearing and being provided with an annular flange formed with a plurality of vertically arranged bores; a detent element within each of said bores and adapted to engage said facets; a thrust nut threaded upon said screw and engaging said sleeve to transmit to said thrust bearing the weight of said screw and the arm carried thereby; a second nut threaded on said screw above said thrust nut; and spring means surrounding said sleeve and interposed between said second nut and said detent elements, said second nut being adjustable on said screw to vary the tension of said spring means thereby to determine the pressure of said detents on said facets.

2. In a radial drill having a column, an arm translatable thereon and a power driven transmission including a normally stationary screw supported from said column and a rotatable nut carried by said arm and threaded on said screw for translating said arm on said column; an impositive clutch more effective in one direction of rotation than in the other, for normally holding said screw against rotation by said nut, said clutch comprising a ring non-rotatably secured to said column and provided with a plurality of series of oppositely inclined facets, the inclination of the facets of one series being materially greater than the inclination of the facets of the other series; a member surrounding said screw and keyed thereto and having a horizontally disposed annular flange overlying said facets, said flange being provided with a plurality of vertically arranged apertures; a spring pressed detent in each of said apertures adapted, in oppositely directed rotations of said screw, to engage said oppositely inclined facets; a second nut threaded on said screw and overlying and engaging said member to transmit thereto and thence to said column the weight of said screw and the arm carried thereby.

3. In a radial drill having a column, an arm translatable thereon and a power driven transmission including a normally stationary screw supported from said column and a rotatable nut carried by said arm and threaded on said screw for translating said arm on said column; a torque discriminator for impositively holding said screw against rotation by said nut, said discriminator being more positive in one direction of rotation than in the other direction and comprising a ring surrounding said screw and non-rotatably secured to said column and provided with two series of oppositely inclined facets, the inclination of the facets of one series being substantially greater than the inclination of the facets of the other series, a member held against rotary and axial movement relative to said screw and having an annular flange overlying said facets provided with a plurality of vertically arranged apertures; spring pressed detents arranged in said apertures and adapted to engage said facets therebeneath; an annular casing surrounding said ring and member and a nut threaded on said screw and adapted, by adjustment to vary the pressure of said detents on said facets, said nut being provided with an annular depending portion having a telescoping connection with said casing to form a closed casing for said torque discriminator.

4. A radial drill combining a column; an arm translatable thereon; a power driven transmission including a normally stationary screw supported from said column exteriorly thereof and a rotatable nut carried by said arm and threaded upon said screw for translating said arm on said column; an impositive clutch supported by said column and acting upon said screw normally to hold it against rotation, said clutch being constructed to resist only a predetermined torque during depression of said arm and only a greater predetermined torque during elevation thereof and comprising a horizontally disposed member provided with a plurality of sets of oppositely and unequally inclined facets each inclined to a vertical plane, a vertically movable detent element arranged between each pair of oppositely inclined facets and spring means carried by said screw and acting parallel thereto to maintain said detents in engagement with said horizontally disposed member thereby yieldingly to resist movement of said detents under the camming action of said facets.

H. HENRY SUNDERMANN,
*Executor of the Last Will and Testament of David C. Klausmeyer, Deceased.*